(12) United States Patent
Zelmanov

(10) Patent No.: US 6,733,078 B1
(45) Date of Patent: May 11, 2004

(54) TWO-POSITION LATCH APPARATUS

(75) Inventor: Dmitriy Zelmanov, Southfield, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/318,918

(22) Filed: Dec. 13, 2002

(51) Int. Cl.$^7$ .............................. B60N 2/02; E05C 3/06
(52) U.S. Cl. .............................. 297/378.1; 297/378.12; 297/378.13; 292/201; 292/216; 296/65.01; 296/65.16
(58) Field of Search ........................ 297/378.13, 378.12, 297/378.1; 296/65.01, 65.16; 292/201, 216, DIG. 23, DIG. 42, DIG. 43

(56) References Cited

U.S. PATENT DOCUMENTS

| | | | | |
|---|---|---|---|---|
| 4,365,838 A | * | 12/1982 | Berg | 297/378.11 |
| 4,711,493 A | * | 12/1987 | Schrom et al. | 297/378.13 |
| 4,726,622 A | * | 2/1988 | Palvolgyi | 297/378.12 |
| 4,773,693 A | * | 9/1988 | Premji et al. | 296/65.03 |
| 5,383,707 A | * | 1/1995 | Osenkowski et al. | 297/238 |
| 5,603,550 A | * | 2/1997 | Holdampf et al. | 297/238 |
| 5,915,779 A | * | 6/1999 | Duchateau | 296/65.16 |
| 6,283,550 B1 | * | 9/2001 | Vialatte et al. | 297/335 |
| 6,378,920 B1 | * | 4/2002 | Ostrowski et al. | 292/216 |
| 6,540,272 B2 | * | 4/2003 | Spurr | 292/216 |

* cited by examiner

Primary Examiner—Peter M. Cuomo
Assistant Examiner—Sarah C. Burnham
(74) Attorney, Agent, or Firm—Harness, Dickey & Pierce, P.L.C.

(57) ABSTRACT

A seat latch mechanism accommodating a pair of seatback positions, comprising a housing, a latch assembly, and an actuation assembly operably supported by the housing and in operable communication with the latch assembly to selectively unlatch the latch assembly. The housing is adapted to receive a striker assembly having a first and second striker bar, whereby the latch mechanism is adapted to lock the first striker bar in a first latched position and the second striker bar in a second latched position. The actuator serves to apply a force to either of the first or second striker bars when in the first and second latched positions respectively to reduce noise and avoid chucking. The actuation handle serves to release the striker assembly from the latch mechanism and also to allow the first and second striker bars to toggle between the first and second latched positions.

32 Claims, 12 Drawing Sheets

TWO-POSITION LATCH APPARATUS

FIELD OF THE INVENTION

The present invention relates to latch mechanisms and, more particularly, to an improved latch mechanism for a seat assembly.

BACKGROUND OF THE INVENTION

In automotive applications, it is increasingly desirable that a vehicle be capable of accommodating varying requirements, such as cargo carrying and the like. It is further desirable that a vehicle be capable of accommodating varying requirements with respect to occupant comfort. To that end, reconfiguration of the vehicle seating system plays a significant role.

Generally speaking, articulation of a seatback enables a vehicle interior to be configurable for accommodating cargo-carrying needs and to provide occupant comfort. Latching mechanisms are often used to selectively anchor a seatback to a stationary striker assembly, thereby securing the seatback to a vehicle structure. In such a system, a conventional latching mechanism cooperates with a striker to provide the seatback with one of either a latched position or an unlatched position. In the latched position the seatback is secured to the vehicle structure in a fixed relationship. In the unlatched position the seatback is free to be dumped forward or folded flat. Conventional latching mechanisms suffer from the disadvantage that they only allow for the seatback to be latched in a single position, thereby hampering occupant comfort.

In addition, conventional latch mechanisms cooperating with striker assemblies also limit the flexibility of a cargo area of a vehicle located behind a vehicle seat. Current seating systems accommodate large cargo by folding the seatback in a substantially fold-flat position such that the seatback is generally parallel to the seat bottom. In other known systems, the seatback is again folded flat, and together with the seat bottom, the seatback is articulated or dumped forward, thereby increasing the cargo area of the vehicle. Such systems, while adequately providing for increased cargo areas in a vehicle, do not provide for occupant use of a seat when increased cargo capacity is required.

While some prior art systems provide for positioning of a seatback relative to a seat bottom, such systems require the use of a plurality of strikers, rather than the conventional single striker arrangement. Prior art systems accomplishing a range of adjustment for a seatback relative a seat bottom which employ a plurality of strikers typically require clearance for each striker to pass through the latch mechanism so that the latch mechanism can be moved through the various positions and engage each individual striker. In this manner, the latch mechanism is typically required to have a relatively large body to accommodate each striker passing through the body of the latch mechanism as the mechanism is moved between each individual striker. Further, prior art systems requiring the use of more than one striker cause additional operations during assembly and increase costs. Specifically, the use of additional strikers requires assembly of each individual striker and further often require additional tooling and fixtures, thereby increasing tooling expenses and increasing manufacturing time.

In addition, such prior art latch systems do not adequately compensate for small variations between the striker and the latch mechanism components which may allow the seatback to move a miniscule amount even when the mechanism is locked. These small variations become noticeable at the upper end of the seatback and can cause noise and discomfort to an occupant. For example, the seatback of an unoccupied seat may tend to vibrate when the vehicle encounters rough road conditions, thereby creating undesirable noise and rattling. This magnified play in a latch mechanism has been termed "chucking" and refers to any manufacturing variation or play in the mechanism components or between the mechanism components and a striker that allows movement of the seatback while the mechanism is in a latched condition.

Therefore a latch mechanism in cooperation with a single striker assembly that provides for angular adjustment of a seatback in a plurality of positions relative to the seat bottom and securely latches a seat to a vehicle structure when in a latched position is desirable in the industry. Additionally, providing increased cargo-carrying capability in the cargo area of a vehicle while still maintaining use of the vehicle seat is also desirable. Further yet, it is desirable to provide a latch mechanism that significantly reduces or eliminates chucking of a seat assembly.

SUMMARY OF THE INVENTION

Accordingly, the present invention provides a latch mechanism including a housing, a latch assembly operable between a latched position and an unlatched position, and an actuation assembly operably supported by the housing and in operable communication with the latch assembly to selectively unlatch the latch assembly. The housing is adapted to receive a striker assembly having a first and second striker bar, whereby the latch mechanism is adapted to lock the first striker bar in one of two latched positions relative to the housing. The latch mechanism includes a claw having a first and second recess and an actuator. The first recess receives the first striker bar in the first latched position and the second recess receives the first striker bar in the second latched position. It should be understood that when the first striker bar is locked in the second recess, the second striker bar is locked in the first recess such that both the first and second striker bars are concurrently received by the claw. The actuator serves to apply a force to either of the first or second striker bar when the first or second striker bar is disposed in the first recess to reduce noise and avoid chucking.

In addition, the actuation mechanism includes a lock cam and an actuation handle, whereby the lock cam is rotatably attached to the actuation handle through a link such that as the actuation handle is rotated the lock cam is also rotated. The lock cam serves to lock the actuator in the latched position and thus to securely hold whichever of the first and second striker bars is disposed in the first recess. The lock cam further serves to rotate the cam out of the latched position when rotated by the actuation handle. The actuation handle serves to both release the latch mechanism from the striker assembly through interaction with the lock cam and further to allow the claw to release the striker assembly so that the first striker bar can be toggled between the first and second recesses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

With reference to FIGS. 1, 2A, 2B, and 3 a latch mechanism 10 is provided and includes a housing 12, a latch assembly 14, and an actuation assembly 16. The actuation assembly 16 is pivotably connected to the latch assembly 14 and is supported by the housing 12. The actuation assembly 16 further selectively engages the latch assembly 14 and is also supported by the housing 12.

Figure 3:
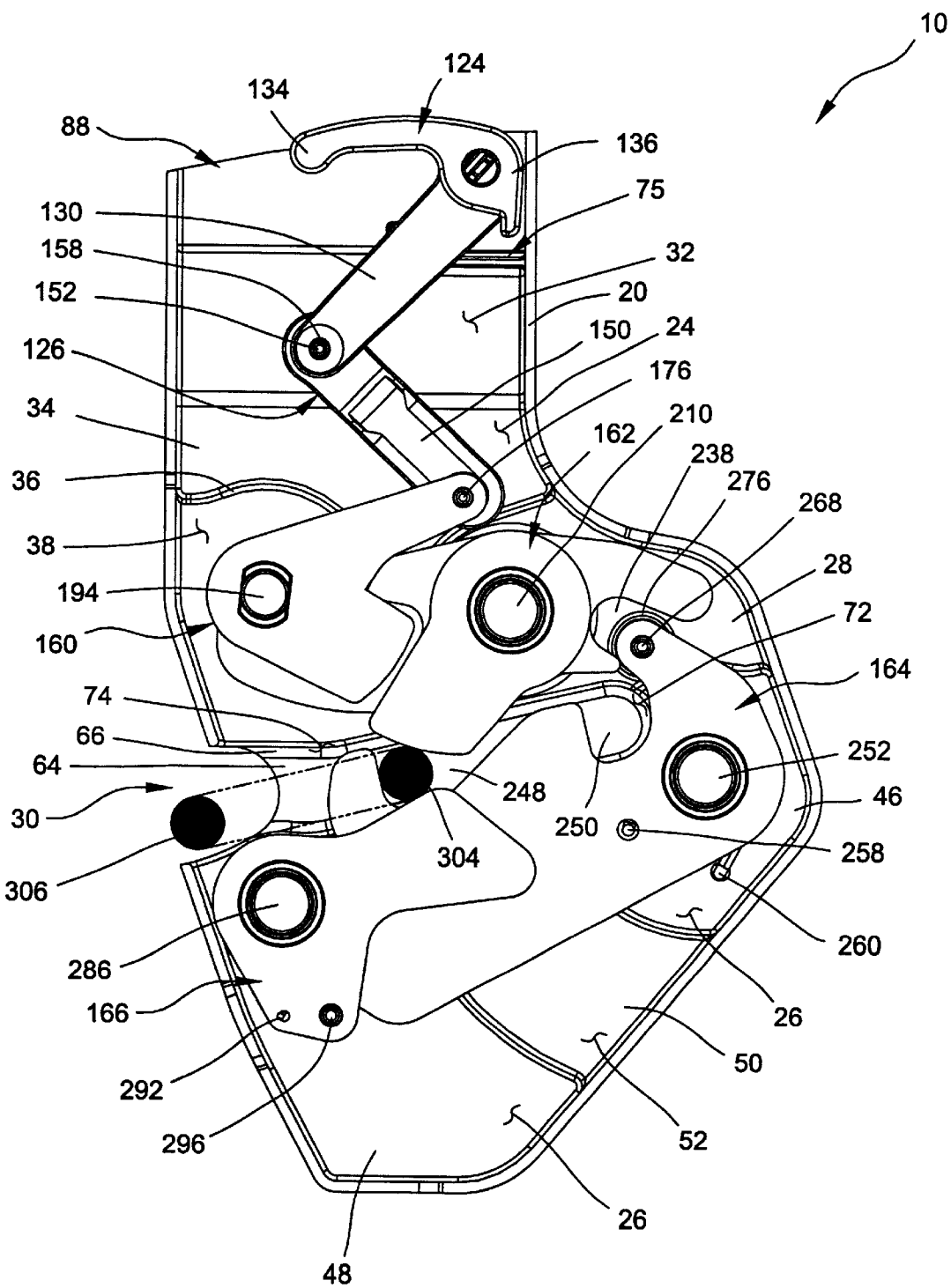
FIG. 3 is a plan view of the latch mechanism with part of a housing removed to show the internal workings of the latch mechanism in a first latched position.

The housing 12 includes a main body 18, a flange 20 axially surrounding the main body 18, and an extension 22. The main body 18 generally extends over the length of the housing 12 and includes a first surface 24, a second surface 26, a first rib 28, and a striker recess 30. The first surface 24 is disposed between the extension 22 and the first rib 28, and includes a ramped surface 32 and a planner surface 34 extending from the edge of the extension 22 to the base of the first rib 28, as best shown in FIG. 3. The first rib 28 laterally extends across the main body 18 generally away from the first surface 24 and includes a wall 36 and planer surface 38 having an attachment aperture 40 and a first bushing aperture 42.

The second surface 26 is disposed on an opposite side of the striker recess 30 from the first surface 24 and includes a first and second section 46, 48 separated by a second rib 50. The second surface 26 extends across both the first and second sections 46, 48 on either side of the second rib 50 such that the second surface 26 is generally planer with the first surface 24. The second rib 50 generally extends from the second surface 26 and includes a reaction surface 52, whereby the reaction surface 52 serves to support the latch assembly 14, as will be described further below. In addition, the first section 46 includes a second bushing aperture 54 and a first spring aperture 56 while the second section 48 includes third bushing aperture 58 and a second spring aperture 60.

The striker recess 30 is formed between the first and second surfaces 24, 26 and includes a base 64 generally planer with the first surface 24, a first side wall 66 integrally formed with the first rib 28, and a second side wall 68 integrally formed with the second rib 50. The striker recess 30 further includes a first end having a slot 70 formed in the flange 20 and a second end having a generally arcuate surface having a reaction surface 72 opposite the first end. The second end may be formed such that it terminates at an inner surface of the flange 20 opposite the slot 70. Alternatively, the second end may be formed such that it terminates prior to reaching an inner side of the flange 20 such that the planer surface 28 of the first rib 28 is adjacent the second surface 26 of the second section 48, as best shown in FIG. 3. In each variation, the first and second side walls 66, 68 further include a reaction surface 74 extending along their lengths.

Figure 2A:
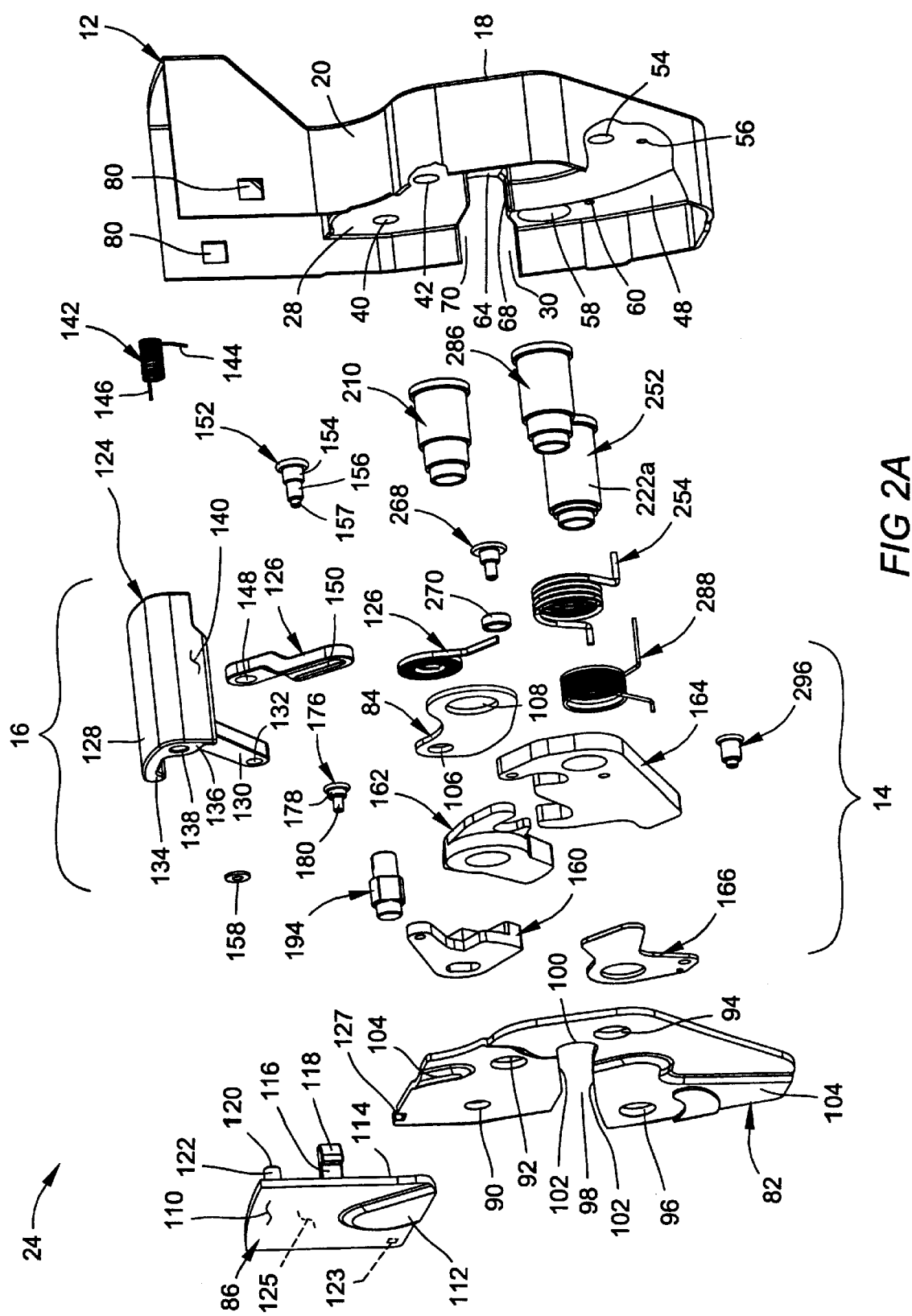
FIG. 2A is an exploded view of the latch mechanism of FIG. 1.

As previously discussed, the extension 22 is disposed adjacent the first surface 24 and includes the ramped surface 32 extending therein. In addition, the extension 22 includes an L-shaped bracket 75 integrally formed therewith for interaction with the actuation assembly 16. The L-shaped bracket 75 includes an engagement surface 76 and a supporting rib 78, whereby the supporting rib 78 serves to strengthen the L-shaped bracket 75 when the L-shaped bracket 75 is subjected to a load from the actuation assembly 16, as will be discussed further below. The extension 22 generally interrupts the flange 20 such that the housing 12 is open over the length of the extension 22, as best shown in FIG. 2A. Disposed adjacent the opening are a pair of attachment slots 80 formed in the flange 20, whereby the slots 80 include a generally square shape and are formed opposite the L-shaped bracket 75.

The housing 12 fixedly supports an outer support 82, an enforcer plate 84, and a cover 86, whereby the outer support 82 and cover 86 cooperate with the flange 20 to form a pocket 88. The pocket 88 is formed generally between the first and second surfaces 24, 26 of the main body 18 and an inner surface of the outer support 82 to provide clearance for the latch assembly 14 and the actuation assembly 16, as will be discussed further below. The outer support 82 is a generally flat plate having a peripheral edge similar in shape to that of the flange 20 and includes first and second attachment apertures 90, 92 co aligned with attachment aperture 40 and first bushing aperture 42 of the first rib 28. The outer support 82 further includes third and fourth attachment apertures 94, 96 co aligned with the second and third bushing apertures 54, 58 of the second surface 26 and a slot 98 co aligned with the striker recess 30 of the housing 12, as best shown in FIG. 2.

Figure 1:
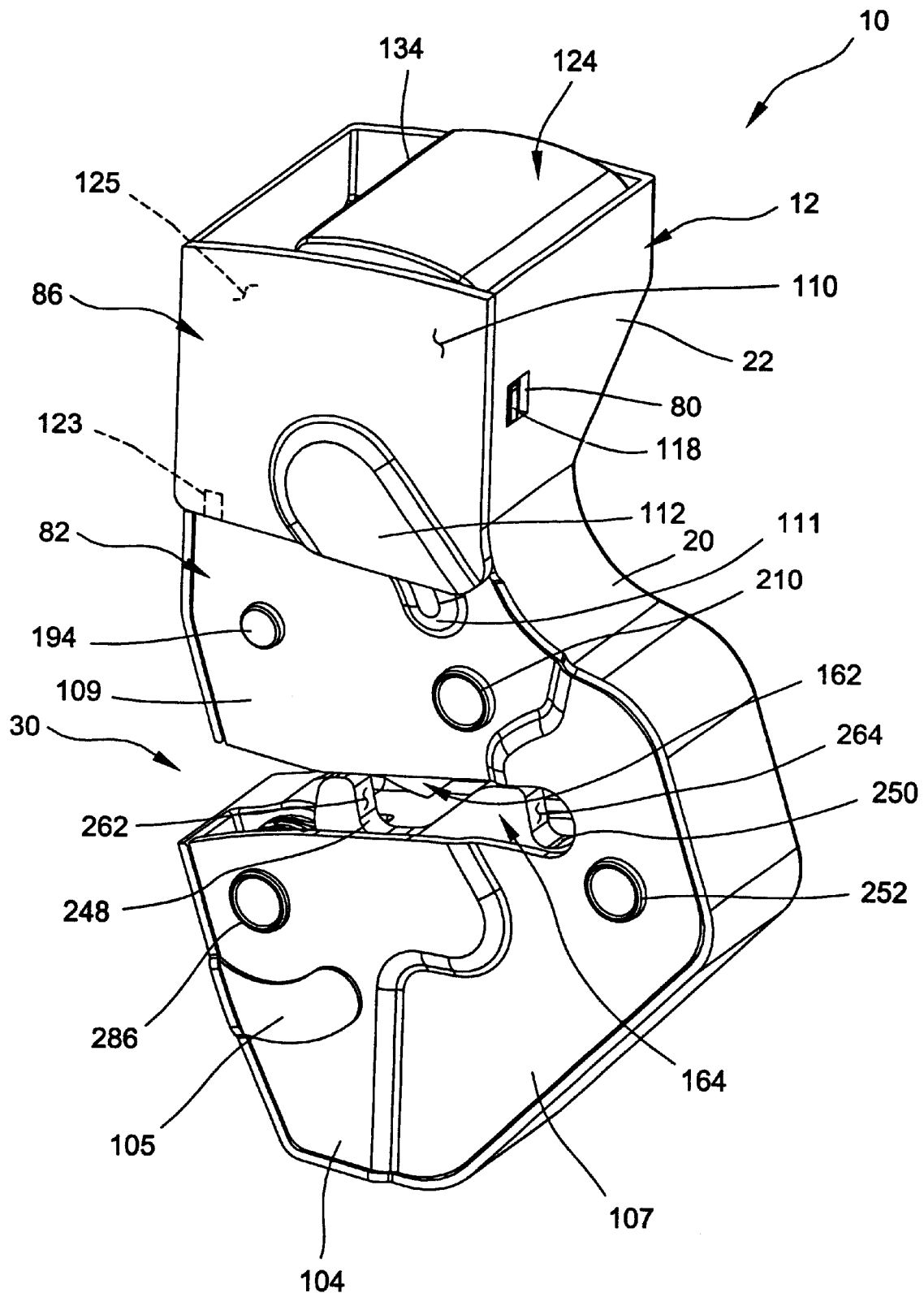
FIG. 1 is a perspective view of a latch mechanism in accordance with the principals of the present invention.

The slot 98 includes a first end generally open and an opposite end having a generally arcuate surface 100 flanked by first and second reaction surfaces 102 extending along the length of the slot 98 from the open end to the arcuate surface 100. The outer plate 82 further includes a first, second, third, fourth, and fifth rib 104, 105, 107, 109, 111 which provide clearance for the internal components associated with the latch assembly 14 and actuation assembly 16 and which cooperate to generally form an outer surface of the outer plate 82, as best shown in FIG. 1.

Figure 2B:
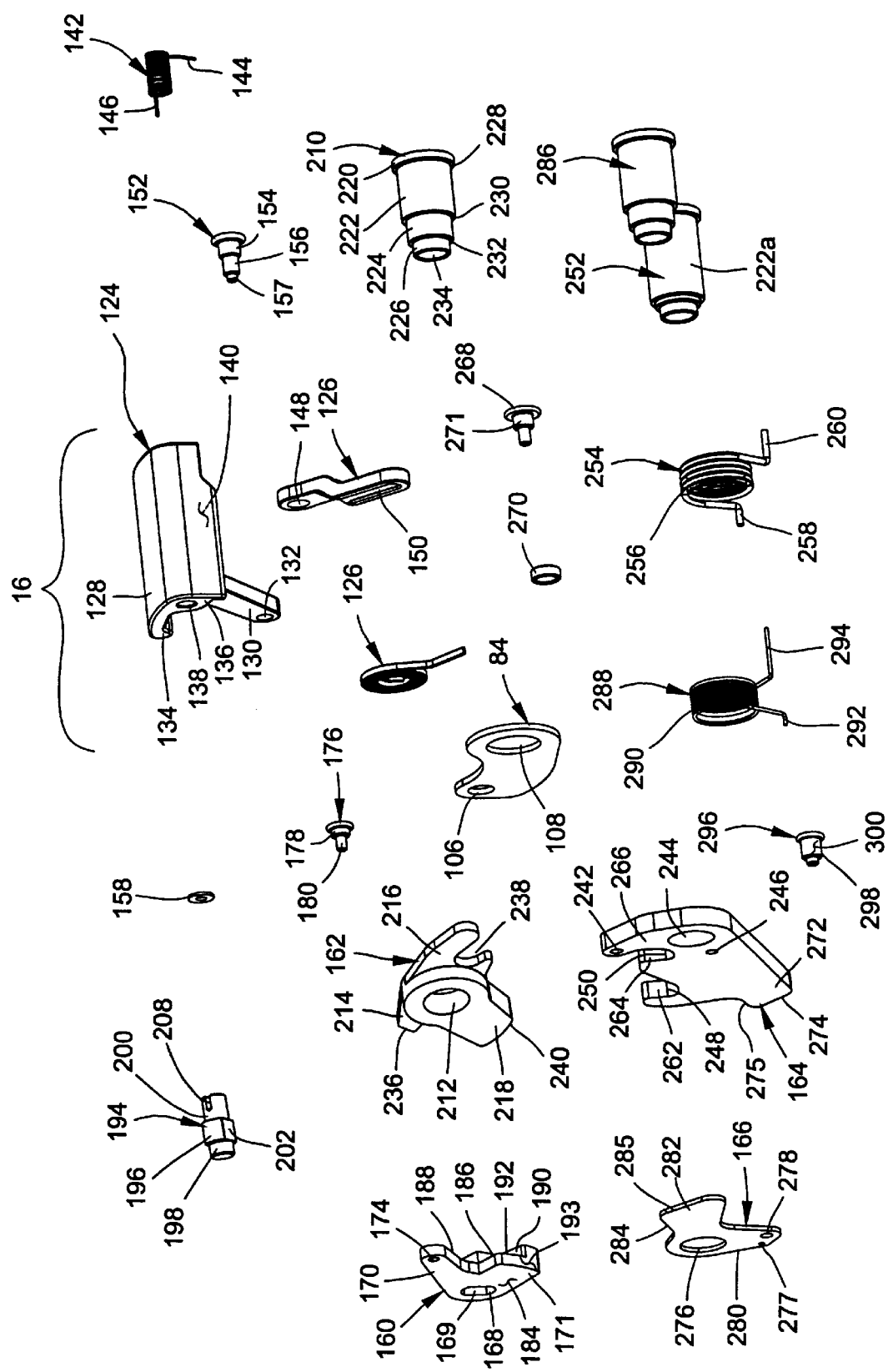
FIG. 2B is a more detailed exploded view of particular components of FIG. 2A.

The enforcer plate 84 is a flat member having a first attachment aperture 106 at a first end and a second attachment aperture 108 at a second end. The enforcer plate 84 is disposed between the planer surface 38 of the first rib 28 and an inner surface of the outer plate 82, as best shown in FIGS. 2A and 2B. Specifically, the first attachment aperture 106 is aligned with attachment aperture 40 while the second attachment aperture 108 is aligned with the first bushing aperture 42 for attachment to the first rib 28. The enforcer plate 84 serves to reinforce the first rib 28 when the housing 12 is formed from a generally pliable material such as plastic. The enforcer plate 84 is formed from a rigid material such as, but not limited to, steel. In this manner, the enforcer plate 84 serves to locally strengthen the first rib 28 and provide support for the latch assembly 16. While the housing 12 and enforcer plate 84 are described as being constructed of plastic and steel respectively, it should be noted that either could be formed from steel or plastic and as such should be considered as part of the present invention.

The cover 86 includes a first surface 110 having a raised portion 112 and a second surface 114 having a pair of posts 116 extending therefrom. The raised portion 112 of the first surface 110 provides the cover 86 with additional strength and further provides clearance on the second surface 114 for the actuation assembly 16. The posts 116 each include a flange 118 integrally formed therewith at a distal end are fixedly attached to the cover 86 at a proximal end in an opposing manner, whereby each flange 118 is received by the attachment slots 80. The flanges 118 serve to selectively attach the cover 86 to the housing 12, generally at the extension 22, as best shown in FIG. 1 through the interaction between the flanges 118 and the attachment slots 80. In addition, the second surface 114 includes a cylindrical post 120 having an engagement surface 122 for interaction with the actuation assembly 16, as will be discussed further below.

In addition, the cover 86 includes a flange 123 formed on a second surface 125, whereby the second surface 125 is disposed generally opposite from the first surface 110. The flange 123 serves to align the cover 86 with the outer plate 82 such that raised portion 112 is generally aligned with the fifth rib 111 of the outer plate 82. Specifically, the flange 123 is matingly received by a notch 127 formed in the outer cover 82, as best shown in FIGS. 2A and 2B. In this manner, the interaction of the flange 123 and the notch 127 ensures the proper alignment of the outer plate 82 with the cover 86 during assembly and use.

The actuation assembly 16 includes an actuation handle 124 and a link 126, whereby the link 126 is rotatably attached to the actuation handle 124 for communication with the latch assembly 14. The actuation handle 124 is rotatably attached to the housing 12 generally at the extension 22 and includes a main body 128 and an extension 130. The extension 130 is fixedly attached to the main body 128 at a proximal end and includes an attachment aperture 132 at a distal end. The main body further includes a handle portion 134 generally opposite an attachment portion 136. The attachment portion 136 includes an attachment aperture 138 and an engagement surface 140. In addition, the actuation handle 124 includes a handle spring 142, which biases the actuation handle 124 in a counterclockwise direction relative to the view shown in FIG. 3. The handle spring 142 includes first and second extensions 144, 146, whereby the first extension 144 is received by the L-shaped bracket 75 of the extension 22 and the second extension 146 reacts against the engagement surface 140 of the actuation handle 124.

The link 126 includes a first end having an attachment aperture 148 formed therethrough and a second end having a longitudinal slot 150, whereby the first end is generally offset from the second end to better transmit forces applied to the actuation handle 124 to the latch assembly 14, as best shown in FIGS. 2A and 2B. The attachment aperture 148 is aligned with the attachment aperture 132 of the actuation handle 124 and is rotatably attached thereto by a rivet 152. The rivet 152 includes a first, second and third cylindrical sections 154, 156, 157 whereby the first cylindrical section 154 is rotatably received by attachment aperture 148 of the link 126 and the second cylindrical section 156 is rotatably received by aperture 132 of the extension 130. In this manner, the third cylindrical section protrudes from a surface of the extension 130, as best shown in FIG. 2A. To secure the rivet 152 within apertures 132 and 148, a washer 158 is provided and is fixedly staked to the third cylindrical section 157 of the rivet 152. Specifically, the washer 158 is fixedly received by the third cylindrical section 157 which protrudes from aperture 132 and is fixedly attached thereto. In this manner, the extension 130 of the actuation handle 124 is rotatably attached to the link 126 through the connection of attachment apertures 132 and 148.

The latch assembly 14 includes a lock cam 160, an actuator 162, a claw 164, and a push-plate 166. The lock cam 160 includes an attachment aperture 168 having flats 169 and a first and second arm 170, 171 extending therefrom. The first arm 170 includes an attachment aperture 174 formed therethrough, whereby the attachment aperture 174 is aligned with the longitudinal slot 150 of the link 126 for rotatable attachment thereto. Specifically, a rivet 176 having first and second cylindrical sections 178, 180 is received by the slot 150 and the aperture 174 respectively. In this manner, the first cylindrical section 178 is slidably received by the slot 150 while the second cylindrical section 180 is rotatably received by aperture 174. A portion of the second cylindrical section 180 extends from the lock cam 160 and is deformed such that the rivet 176 will maintain the rotatable attachment of the link 126 and the lock cam 160.

The second arm 171 includes a first surface 184 and a second surface 186, whereby the first and second surfaces 184, 186 are formed on opposite sides of the lock cam 160. The first surface 184 is a generally planer surface extending over the length of the lock cam 160 while the second surface 186 includes a planer portion 188 and a recess 190, as best shown in FIG. 2B. The recess 190 includes a first and second engagement surface 192, 193 for interaction with the actuator 162, as will be described further below. The lock cam 160 is received by the housing 12 and is rotatably attached thereto by a rivet 194. Rivet 194 includes a central cylindrical section 196 flanked by first and second cylindrical sections 198, 200, whereby the central cylindrical section 196 further includes a pair of flats 202.

Flats 202 are matingly received by the flats 169 of the attachment aperture 168 such that the rivet 194 is fixed for rotation with the lock cam 160. The first cylindrical section 198 is rotatably received by the first attachment aperture 90 of the outer support 82 while the second cylindrical section 200 is rotatably supported by the attachment aperture 40 of the first rib 28. In this manner, the lock cam 160 rotates about the first and second cylindrical sections 198, 200 between the outer support 82 and the housing 12.

The lock cam 160 is biased into a clockwise direction relative to the view shown in FIG. 3 by a coil spring 126, whereby the coil spring 126 includes a main body 205, an extension 204, and a central flat 206. The central flat 206 is received by a slot 208 formed in the second cylindrical section 200 of the rivet 194 while the extension 204 projects away from the main body 205 for interaction with a first bushing 210. The interaction between the extension 204 and the first bushing 201, combined with the interaction of the central flat 206 and the spring slot 208, creates the bias imposed on the lock cam 160 as previously mentioned.

The actuator 162 includes an attachment aperture 212 and first, second, and third arms 214, 216, 218. The attachment aperture 212 receives the first bushing 210, whereby the first bushing 210 rotatably attaches the actuator 162 to the housing 12. The first bushing 210 includes first, second, third, and fourth cylindrical sections 220, 222, 224, and 226. The first cylindrical section 220 is disposed adjacent the second cylindrical section 222, whereby the first cylindrical section 220 has a larger diameter than that of the second cylindrical section 222 and thus creates a first ridge 228 therebetween. The second cylindrical section 222 is disposed adjacent the third cylindrical section 224, whereby the second cylindrical section 222 has a larger diameter than that of the third cylindrical section 224 and thus creates a second ridge 230 therebetween. The third cylindrical section 224 is disposed adjacent the fourth cylindrical section 226, whereby the third cylindrical section 224 has a larger diameter than that of the fourth cylindrical section 226 and thus creates a third ridge 232 therebetween. The first, second, third, and fourth cylindrical sections 220, 222, 224, and 226 further include a bore 234 formed therethrough.

As previously discussed, the first bushing 210 serves to rotatably attach the aperture 162 to the housing 12. Specifically, the first cylindrical section 220 is received by the first bushing aperture 42 of the housing 12 such that the first ridge 228 reacts against an outer surface of the housing 12. In addition, the housing 12 further includes a recess (not shown) formed on an outer surface of the housing 12, whereby the recess receives the first ridge 228 to maintain the relationship of the first bushing 210 to the housing 12 and prevent further movement of the first bushing 210 into the housing 12. In this manner, the second, third, and fourth cylindrical sections 222, 224, 226 of the first bushing 210 extend into the pocket 88 of the housing 12.

The second cylindrical section 222 extends through the first bushing aperture 42 of the first rib 28 as well as through the second attachment aperture 108 of the enforcer plate 84. The second cylindrical section 222 further extends through the attachment aperture 212 of the actuator 162, whereby the actuator 162 rotates about the second cylindrical section 222. The fourth cylindrical section 226 is received by second attachment aperture 92 of the outer support 82, whereby the third ridge 232 reacts against an inner surface of the outer support 82.

The first arm 214 of the actuator 162 includes an engagement surface 236, whereby the engagement surface 236 interacts with the engagement surface 192 on recess 190 of the lock cam 160. The second arm 216 includes a slot 238 for communication with the claw 164 while the third arm 218 includes a reaction surface 240 disposed at a distal end of the third arm 218.

The claw 164 is a generally flat member having an attachment aperture 242, a bushing aperture 244, a spring aperture 246, and a first and second notch 248, 250. The claw 164 is rotatably supported by a second bushing 252 between the housing 12 and the outer plate 82. The second bushing 252 is substantially similar to the first bushing 210, therefore like reference numerals will be used hereinafter to describe like components while like reference numerals with letter extensions will be used to designate modified components. The second bushing 286 is received by the second bushing aperture 54 of the housing 12 and also by the bushing aperture 244 of the claw 164. Specifically, the second cylindrical section 222 is first received by the second bushing aperture 54, then by the bushing aperture 244 of the claw 164, whereby a coil spring 254 is disposed therebetween. In this manner, the coil spring 254 is disposed between the claw 164 and an inner surface of the housing 12 and serves to biases the claw 164 in a counterclockwise direction relative to the view shown in FIG. 3. Finally, the fourth cylindrical section 226 is received through the third attachment aperture 94 of the outer support 82. In this manner, the claw 164 rotates about the second cylindrical section 222 between the housing 12 and the outer support 82.

Figure 4:
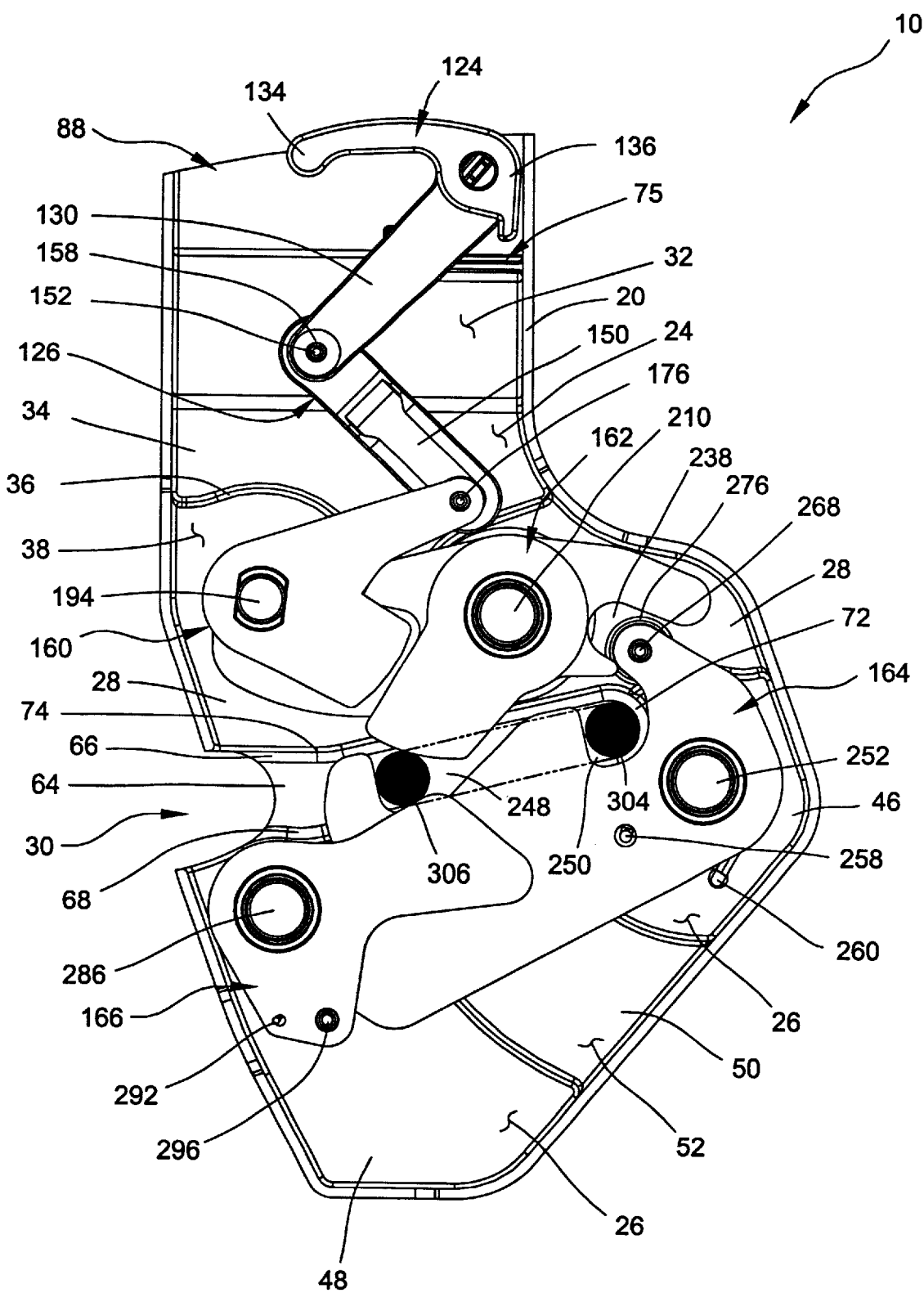
FIG. 4 is a plan view of the latch mechanism with part of a housing removed to show the internal workings of the latch mechanism in a second latched position.

The coil spring 254 includes a central cylindrical body 256 adapted to fit onto the second cylindrical section 222 of the second bushing 252 and first and second spring posts 258, 260. The central cylindrical body 256 receives the second cylindrical section 222 such that the coil spring 254 is disposed between the claw 164 and the housing 12, as best shown in FIG. 4. The first spring post 258 is received by the spring aperture 246 of the claw 164 while the second spring post 260 is received by the first spring aperture 56 of the housing 12. In this manner, the coil spring 254 serves to bias the claw 164 in the clockwise direction due to the interaction of the first spring post 158 with the claw 164 and the interaction of the second spring post 160 with the housing 12.

The first and second notches 248, 250 each include a reaction surface 262, 264 and are disposed adjacent one another, as best shown in FIG. 2B. In addition, the second notch 264 is disposed adjacent a first extension 266, whereby attachment aperture 242 is disposed on the first extension 266. Attachment aperture 266 receives a rivet 268 and a roller 270, whereby the roller 270 is rotatably received by an outer surface 271 of the rivet 268 and matingly engages the slot 238 of the actuator 162. In this manner, the roller 270 engages the slot 238 and thus communicates with the actuator 162. Specifically, rotation of either the claw 164 or the actuator 162 will cause the roller 270 to rotate about the rivet 268 generally along the slot 238. Movement of the roller 270 along the slot 238 due to movement of either the claw 164 or the actuator 162 causes movement of the other of the claw 164 and the actuator 162, as will be discussed further below. The claw 164 further includes a second extension 272 disposed generally opposite the first extension 266, whereby the second extension 272 includes a first and second engagement face 274, 275 for interaction the push-plate 166.

The push-plate 166 is a generally flat member having a bushing aperture 276, a spring aperture 277, and an attachment aperture 278. The push-plate 166 further includes a first and second arm 280, 282, whereby the spring aperture 277 and attachment aperture 278 are disposed on the first arm 280, as best shown in FIG. 4. The second arm 282 includes a first and second engagement face 284, 285 and extends away from the attachment aperture 278. The push-plate 166 is rotatably supported between the housing 12 and the outer plate 82 by a third bushing 252. The third bushing 252 is generally similar to the first bushing 210, therefore like reference numerals will be used hereinafter to describe like components while like reference numerals with letter extensions will be used to designate modified components.

The third bushing 252 is received by the third bushing aperture 58 of the housing 12 to rotatably attach the push-plate 166 thereto. The second cylindrical section 222a is received by the attachment aperture 276 of the push-plate 166 and also receives a coil spring 288, whereby the coil spring 288 biases the push-plate 166 in the counterclockwise direction.

The coil spring 288 includes a central cylindrical body 290 adapted to fit onto the second cylindrical section 222a of the third bushing 286 and first and second spring posts 292, 294. The central cylindrical body 290 receives the second cylindrical section 222a such that the coil spring 288 is disposed between the push-plate 166 and the housing 12, as best shown in FIG. 4. The first spring post 292 is received by the spring aperture 277 of the push-plate 166 while the second spring post 294 is received by the second spring aperture 60 of the housing 12. In this manner, the coil spring 288 serves to bias the push-plate 166 in the counterclockwise direction due to the interaction of the first spring post 292 with the push-plate 166 and the interaction of the second spring post 294 with the housing 12.

The attachment aperture 278 receives a rivet 296 for interaction with the claw 164 to hold the claw 164 in a position against the bias of spring 254. Rivet 296 includes generally cylindrical body 298 having a reaction surface 300 disposed along its length. As best shown in FIGS. 2B and 3, the rivet 296 serves to interact with the second arm 272 of the claw 164 and serves to maintain the latch mechanism 10 in an unlatched position, as will be discussed further below.

Figure 5:
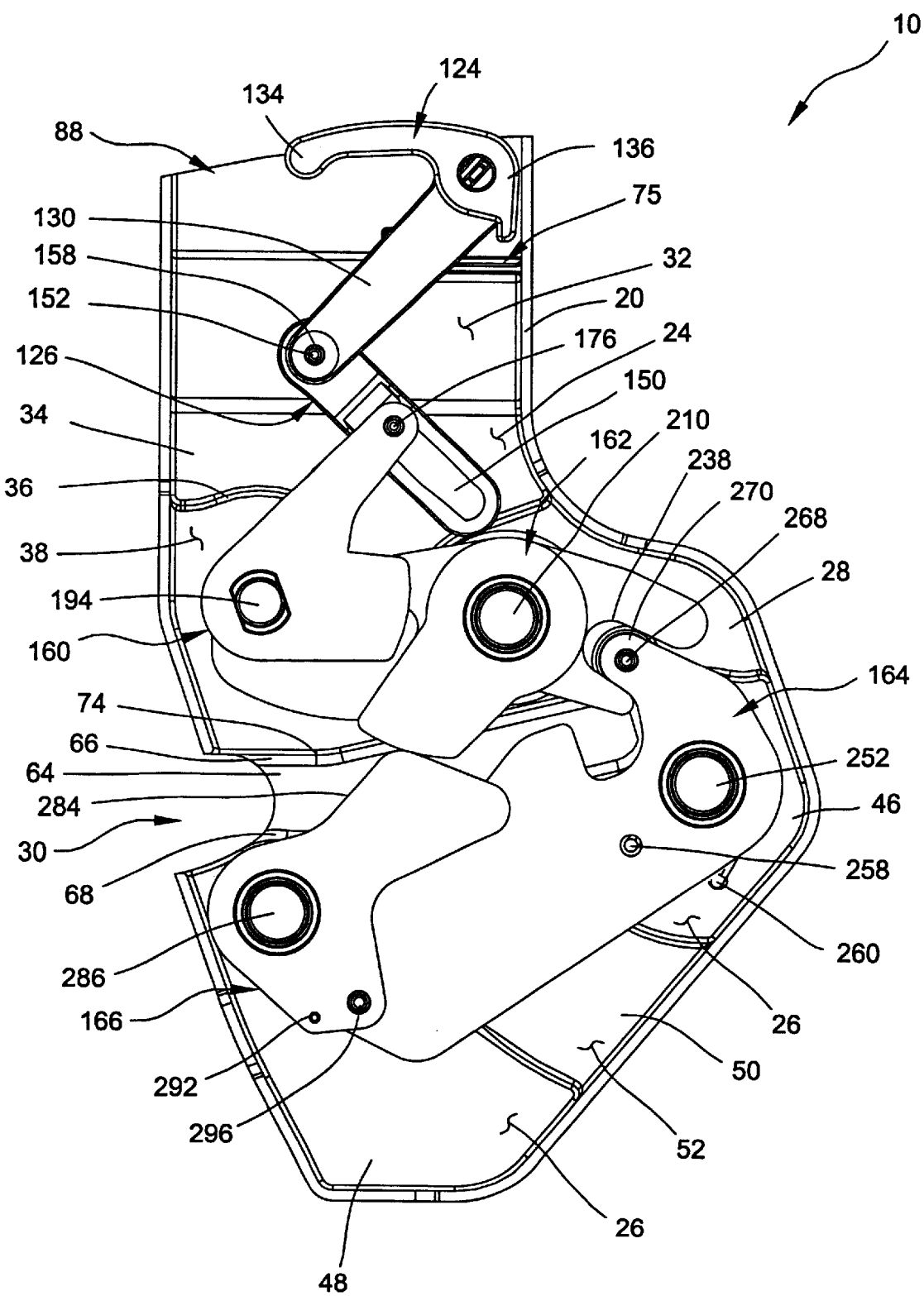
FIG. 5 is a plan view of the latch mechanism with part of a housing removed to show the internal workings of the latch mechanism in an unlatched position.
Figure 6:
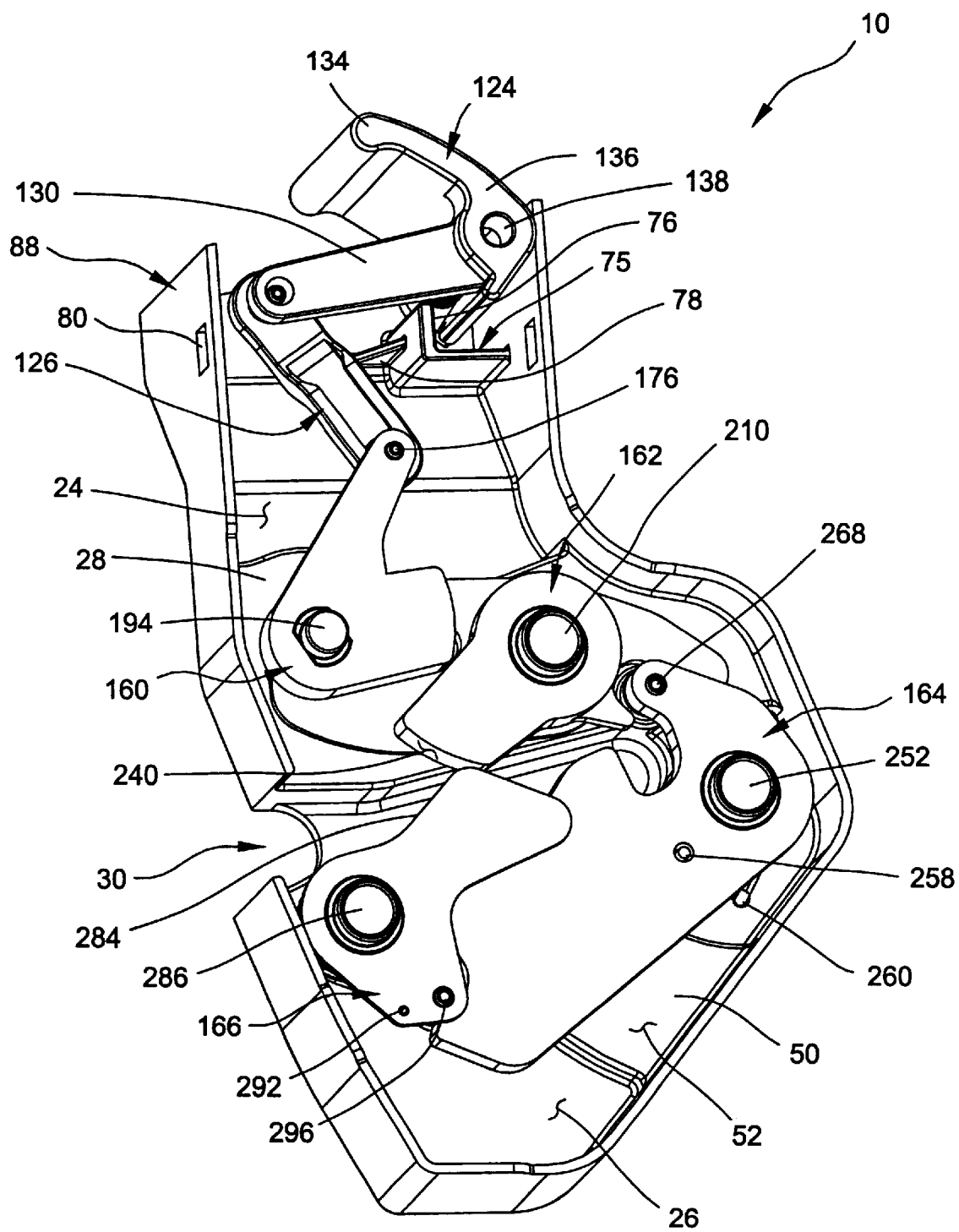
FIG. 6 is a perspective view of the latch mechanism with part of a housing removed to show the internal workings of the latch mechanism in an unlatched position in response to articulation of an actuation mechanism.

With particular reference to FIGS. 5–9, the operation of the latch mechanism 10 will be described in detail. In the unlatched position, the push-plate 166 extends into the opening of the striker recess 30, as best shown in FIG. 5. In this position, the claw 164 is held from rotating into the striker recess 30 by the interaction of the rivet 296 and the second arm 282 of the claw 164. In this regard, the claw 164 is held in this position against the bias of coil spring 254.

To toggle the latch mechanism 10 from the unlatched position to the latched position, a force is applied to the push-plate 166 generally along the engagement face 284. Once this force is applied, the push-plate 166 will rotate in the clockwise direction against the bias of coil spring 288. Sufficient rotation of the coil spring 288 in the clockwise direction will allow the coil spring 254 to rotate the claw 164 in the clockwise direction. Specifically, once the push-plate 166 is sufficiently rotated in the clockwise direction due to the external force applied to the engagement face 284, the engagement face 274 of the claw 164 will disengage the from the reaction surface 300 of the rivet 296. Once the claw 164 is disengaged from the rivet 296, the coil spring 288 is allowed to rotate the claw 164.

Figure 7:
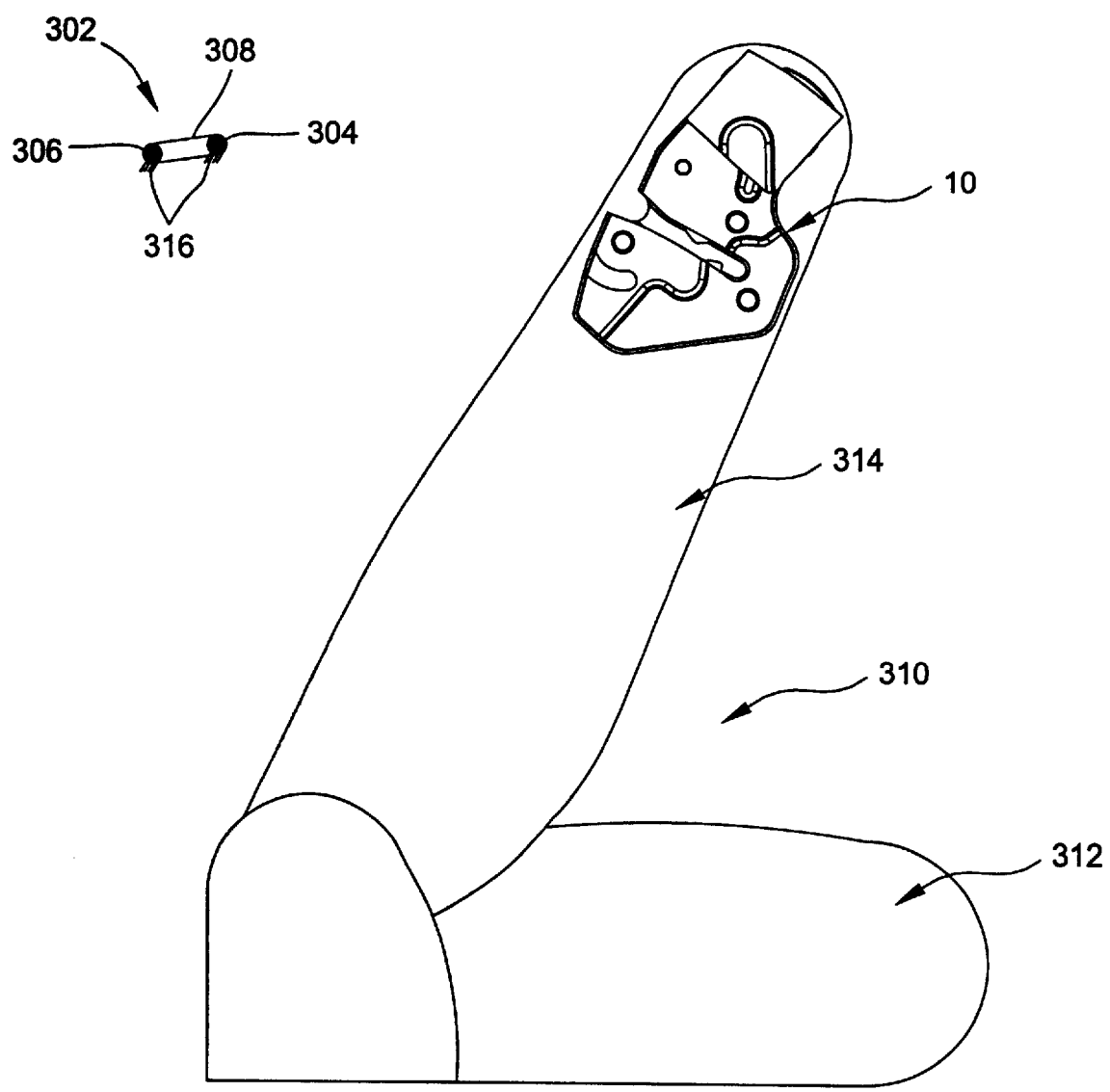
FIG. 7 is a side view of the latch mechanism in a seat assembly.

In one embodiment, the force applied to the push-plate 166 is caused by the interaction of a striker assembly 302 and the engagement face 284. Striker assembly 302 includes a first and second striker bar 304, 306 interconnected by a cross-member 308, as best shown in FIG. 7. The first striker bar 304 contacts the engagement face 284 of the push-plate 166, thereby causing the push-plate 166 to rotate in the clockwise direction as indicated above. In this manner, either the latch mechanism 10 or the striker assembly 302 is moving relative to the other of the striker assembly 302 or the latch mechanism 10, thereby causing the first striker bar 304 to travel along the striker recess 30. As previously discussed, as the push-plate 166 is removed from contact with the claw 164, the claw 164 is rotated in the clockwise direction due to the bias of the coil spring 254.

As the claw 164 rotates in the clockwise direction, the first striker bar 304 engages the first notch 248 of the claw 164, whereby the first striker bar 304 is essentially locked between the first notch 248 of the claw 164, the slot 98 of the outer support 82, and the side walls 66, 68 of the striker recess 30. In addition, the first striker bar 304 is held in frictional engagement with the housing 12, the outer support member 82, and the first notch 248 by a force applied by the actuator 162. The actuator 162 contacts the first striker bar 304 through rotation of the claw 164 and the interaction between the roller 270 and the slot 238. Specifically, as the claw 164 rotates in the clockwise direction, the roller 270 is caused to travel along the slot 238 and concurrently rotate the actuator 162 about the second bushing 252.

Sufficient rotation of the actuator 162 causes the third arm 218 to extend into the striker recess 30 and apply a force directly to the first striker bar 304. The actuator 162 is held in this position by the engagement of surface 193 of the lock cam 160 and the second arm 216 of the actuator 162. Specifically, as the lock cam 160 is allowed to engage the actuator 162, the bias of the coil spring 126 causes the lock cam 160 to rotate in the clockwise direction, thereby causing the engagement surface 193 to engage the second arm 216 of the actuator 162. In this manner, the lock cam 160 holds or locks the actuator 162 in a position whereby the third arm 218 of the actuator 162 applies a force directly to the first striker bar 304. The application of this force to the first striker bar 304 causes the first striker bar 304 to react against the first notch 248 of the claw 164, the slot 98 of the outer support 82, and the side walls 66, 68 of the striker recess 30, thereby reducing chucking by restricting the first striker bar 304 from moving within the first notch 248.

Through rotation of the lock cam 160 in the clockwise direction, the rivet 176 is caused to slide along the slot 150 from the top of the slot 150 to a position generally at the bottom of the slot 150 and at a point farthest away from the actuation handle 124. Movement of the rivet 176 along the slot 150 does not cause rotation or translation of the link 126 or the actuation handle 124 because the rivet 176 is allowed to move relative the link 126 within the slot 150 without causing movement of the link 126 or the actuation handle 124.

To release the first striker bar 124, a force is applied to the actuation handle 124 such that the actuation handle 124 is caused to rotate against the bias of the handle spring 142 in the clockwise direction. Because the rivet 176 is disposed generally at the bottom of the slot 150 when the latch mechanism 10 is in the latched position and the lock cam 160 is engaged with the actuator 162, rotation of the actuation handle 124 causes the link 126 to translate and immediately impart a force on the rivet 176, thereby causing the lock cam 160 to be rotated against the bias of the spring 126. Sufficient rotation of the actuation handle 124 causes the lock cam 160 to rotate the actuator 162 in the clockwise direction and ultimately causes the claw 164 to rotate therewith.

The claw 164 is caused to rotate when the actuator 162 is rotated due to the relationship of the roller 270 within the slot 238 of the actuator 162. In this manner, sufficient rotation of the actuator 162, as caused by the rotation of the lock cam 160, will cause the claw 164 to be rotated in the counterclockwise direction against the bias of spring 254. Sufficient rotation of the claw 164 causes the second arm 272 of the claw 164 to engage the rivet 296 of the push-plate 166 generally at engagement surface 275, thereby locking the claw 164 in the unlatched position. When the claw 164 is selectively locked with the rivet 296 of the push-plate 166, the latch mechanism 10 is in the unlatched position. It should be noted that once the lock cam 160 has been sufficiently rotated such that the claw 164 engages the rivet 296, the actuation handle 124 may be released due to the fact that the engagement face 275 of the arm 272 with rivet 296 will hold the latch mechanism 10 in the unlatched position.

It should be noted that as the second arm 272 of the claw 164 moves between the latched position and the unlatched position, the contact of the claw 164 and the push-plate 166 toggles between interaction of the rivet 296 and the first engagement surface 274 and interaction of the rivet 296 and the second engagement surface 275. In transitioning from the latched position to the unlatched position, the claw 164 releases from engagement with the first engagement surface 274 and engages the rivet at the second engagement surface 275. In this transition, the push-plate 166 is allowed to be rotated by the coil spring 288 such that the first and second engagement faces 284, 285 extend generally into the striker recess 30. Rotation of the push-plate 166 into the striker recess 30 is governed by the interaction of the second engagement surface 275 and the rivet 296, whereby contact of the second engagement surface 275 with the rivet 296 limits the travel of the push-plate 166 into the striker recess 30.

Once the latch mechanism 10 is returned to the unlatched position, the first striker bar 304 may be removed from the striker recess 30 such that the latch mechanism 10 is disengaged from the striker assembly 302 all together. However, to move the first striker bar 304 along the striker recess 30 such that the first striker bar 304 is in a position to engage the second notch 250 of the claw 164 and the second striker bar 306 is in a position to engage the first notch 248 of the claw 164, a force must be applied to the actuation handle 124.

The force applied to the handle 124 causes rotation of the claw 164 through the interaction of the roller 270 with the actuator 162, as previously discussed. Sufficient rotation of the claw 164, such that the second surface 274 engages the rivet 296, ensures that the claw 164 remains in the unlatched position until the first and second striker bars 304, 306 are properly aligned with the second and first notches 250, 248 of the claw 164 respectively. Specifically, the engagement of surface 275 and rivet 296 causes the push-plate 166 to protrude into the recess 30 generally at the first notch 248 such that as the first and second striker bars 304, 306 travel along the recess 30, the second striker bar 306 contacts surface 284 of the push-plate 166, thereby releasing the claw 164. It should be noted that the second striker bar 306 will release the claw 164 only when the second striker 306 is properly aligned with the first notch 248 due to the point along the recess 30 where the second striker bar 306 contacts surface 284 of the push-plate 166. Once the claw 164 is released, the spring 254 rotates the claw 164 into the recess 30, thereby locking the first and second striker bars 304, 306 in the second and first notches 250, 248.

Once the second engagement surface 275 of the claw 164 is in contact with the rivet 296, the actuation handle 124 may be released, thereby allowing the handle spring 142 to rotate the actuation handle 124 in the counterclockwise direction and return the actuation handle 124 to a stowed position generally within the housing extension 22. Concurrently the lock cam 160 is caused to rotate in the clockwise direction under the bias of coil spring 126, whereby engagement surface 193 engages the actuator 162 such that the actuator 162 is caused to rotate in the counterclockwise direction. Sufficient rotation of the actuator 162 in the counterclockwise direction causes the third arm 218 of the actuator 162 to engage the second striker bar 306 and impart a force thereon.

The claw 164 will rotate in the clockwise direction due to the bias imparted thereon by coil spring 254. In addition, sufficient rotation of the actuator 162 causes the roller 270 to travel along slot 238 and further aids in rotating the claw 164 in the clockwise direction. Once the claw 164 is fully rotated in the clockwise direction, the first notch 248 engages the second striker bar 306, thereby locking the striker assembly 302 in a fixed relationship in relation to the latch assembly 10. It should be noted that in this position, the second striker bar 306 reacts against the first notch 248 of the claw 164, the slot 98 of the outer support 82, and the side walls 66, 68 of the striker recess 30, thereby reducing chucking by restricting the second striker bar 306 from moving within the first notch 248. Concurrently, the first striker bar 304 is disposed within the second notch 250 and is permitted to move therein generally between the second notch 250 and the striker recess 30, as best shown in FIG. 4. It should be noted that restriction of movement of either the first or second striker bars 304, 306 within the first notch 248 reduces chucking due to the force exerted thereon by the actuator 162, thereby improving the overall relationship between the striker assembly 302 and the latch mechanism 10.

To unlatch the striker assembly 302 completely from the latch mechanism 10, a force is again applied to the actuation handle 124 such that the actuation handle 124 is caused to rotate in the clockwise direction against the bias of the handle spring 142. Again, sufficient rotation of the actuation handle 124 causes the lock cam 160 to rotate the actuator 162, thereby causing the claw 164 to rotate and release the first and second striker bars 304, 306. Once the claw 164 is in contact with the rivet 296 of the push-plate 166 generally at the second engagement surface 275, the latch mechanism 10 is in the unlatched position and the actuation handle 124 may be released. Once the latch mechanism 10 is in the unlatched position, the first and second strikers 304, 306 may travel along the striker recess 30 until the striker assembly 302 is completely removed from the latch mechanism 10.

Figure 11:
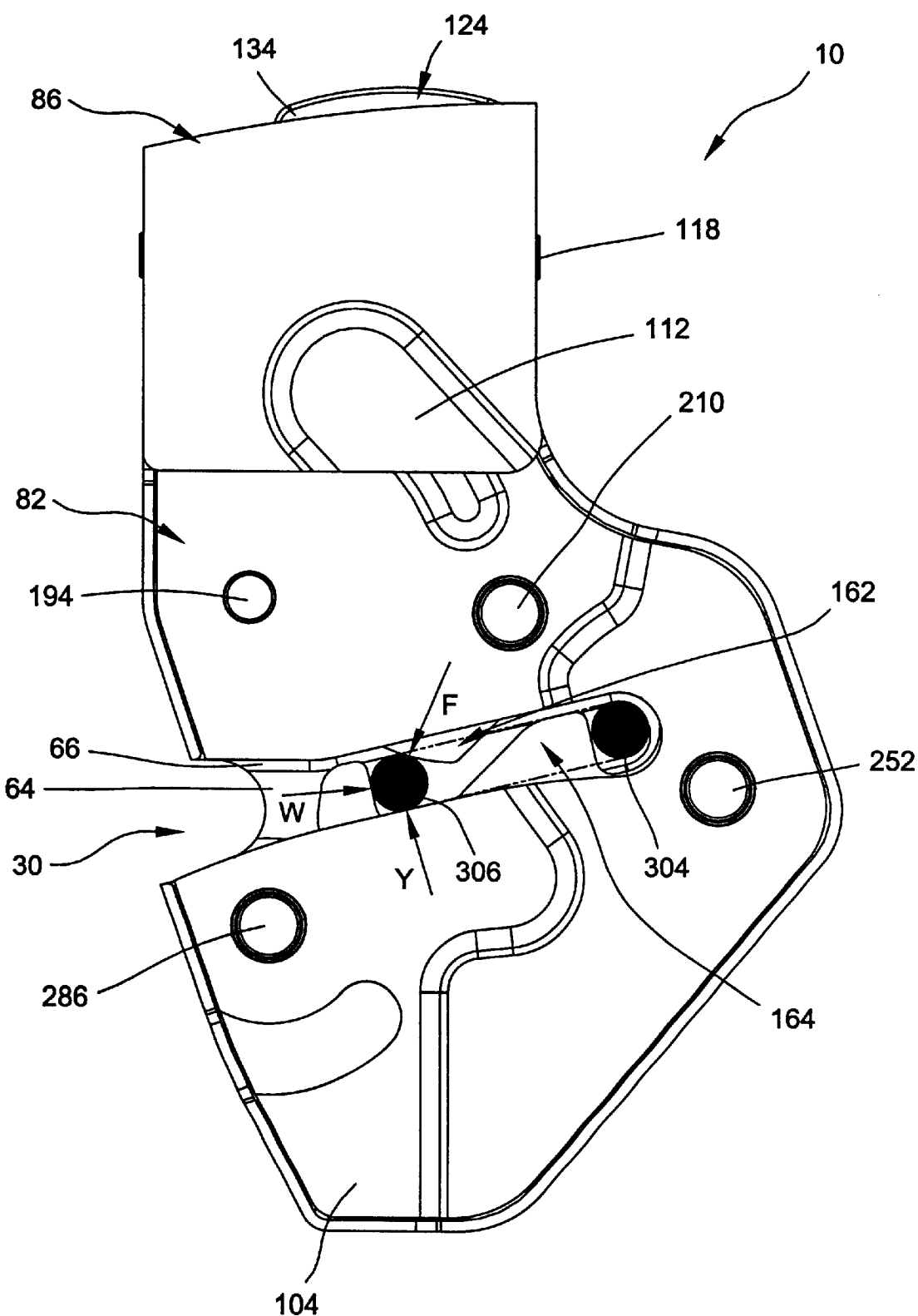
FIG. 11 is a side view of the latch mechanism in a second latched position to show the applied forces on a second striker.

The force applied by the actuator 162 to either the first or second striker bar 304, 306 when either the first or second striker bar 304, 306 is locked in the first notch 248 of the claw 164 is represented as F in FIG. 11. The force F is generated by the interaction of the third arm 218 of the actuator 162 and the first or second striker bar 304, 306 when the first or second striker bar 304, 306 is disposed in the first notch 248. The force F generates reaction forces W, Y as indicated in FIG. 11 due to the interaction of either the first or second striker bar 340, 306 with the first notch 248 of the claw 164, the slot 98 of the outer support 82. In this regard, the first or second striker bar 304, 306 is fixedly held in the first notch 248 by a minimum of a three-point contact as represented by forces F, W, and Y. In this manner, chucking between the latch mechanism 10 and the striker assembly 302 is reduced or eliminated.

Figure 8:
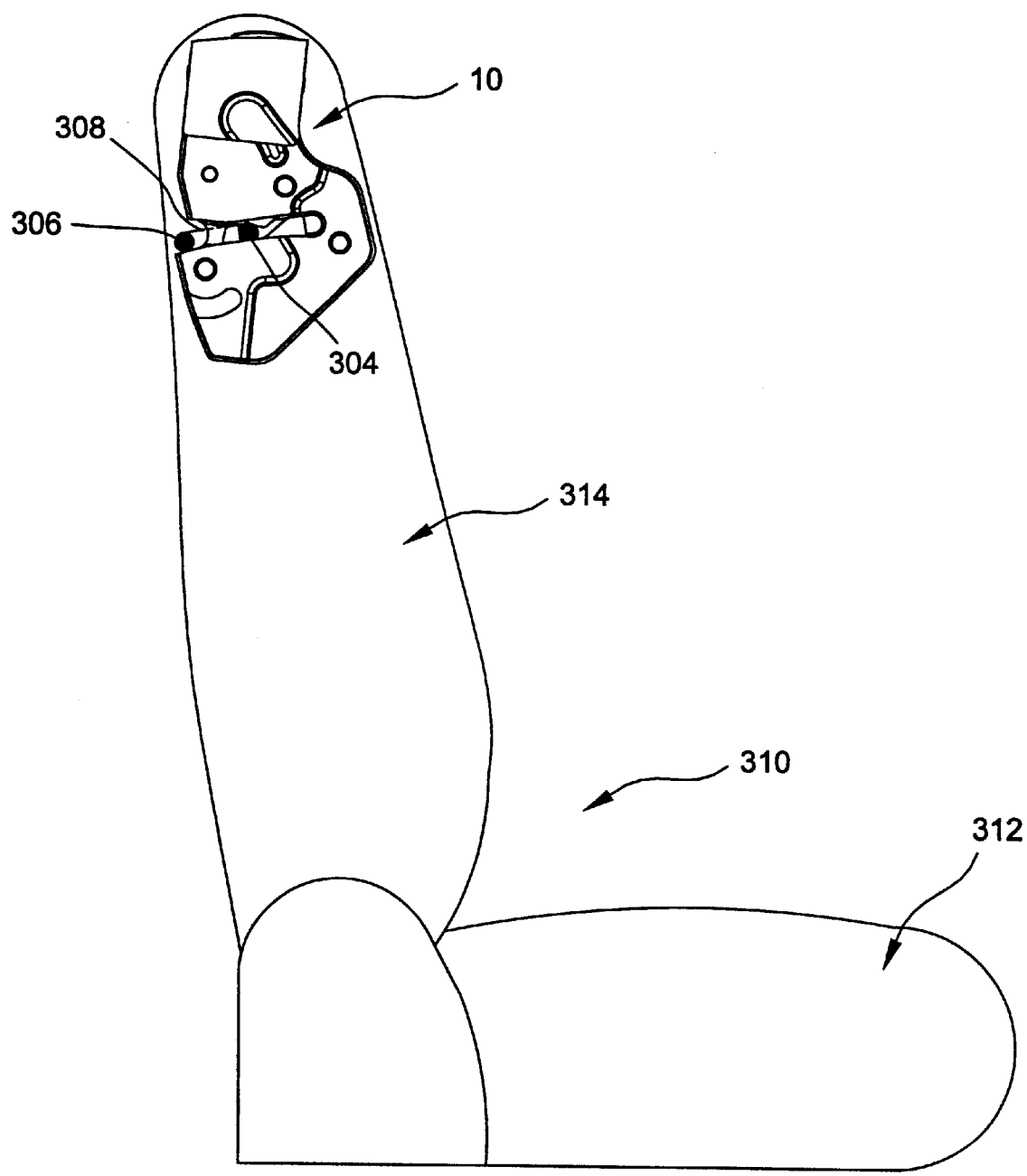
FIG. 8 is a schematic view of the latch mechanism in a first latched position and a seat assembly in a first position.
Figure 9:
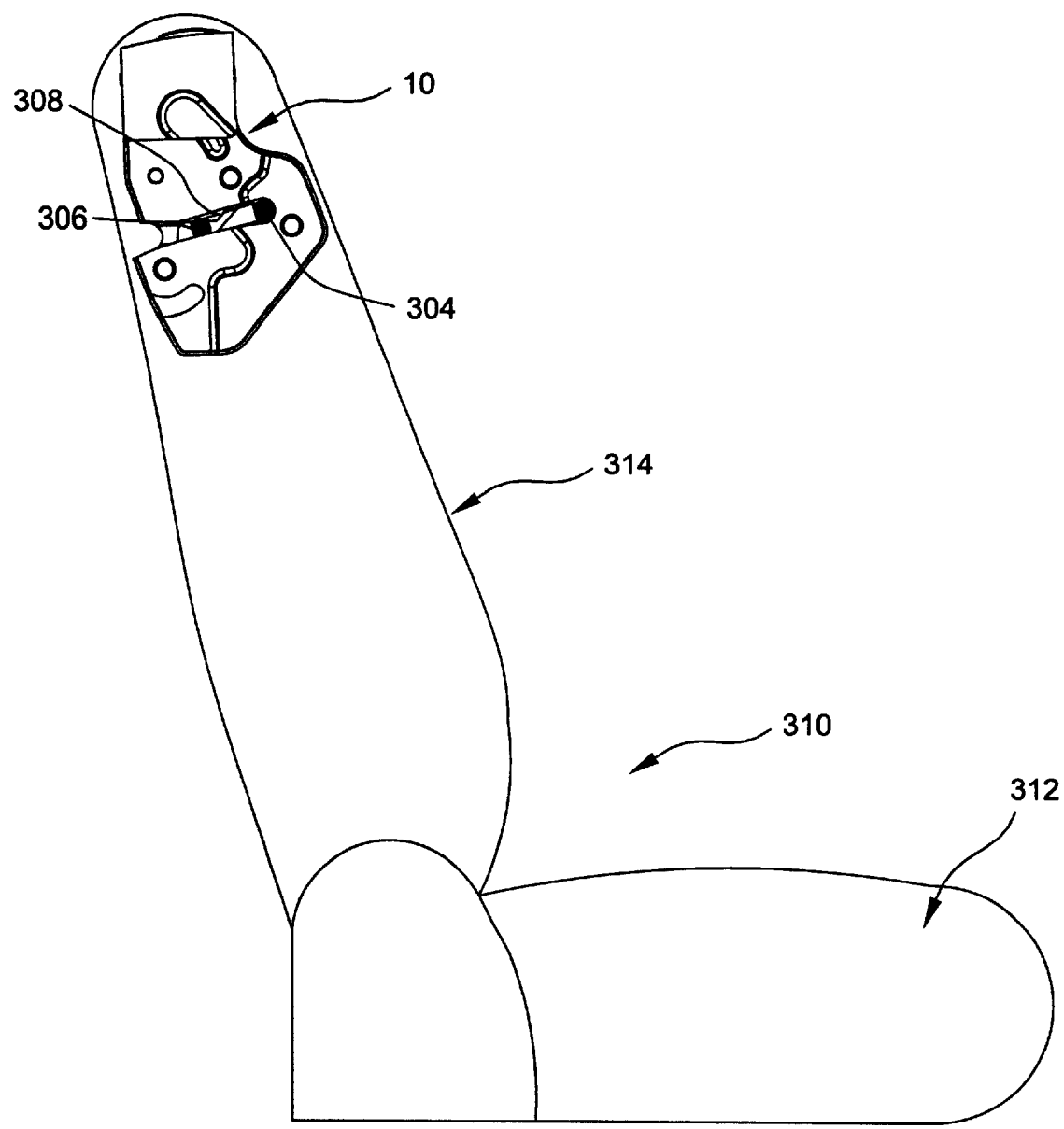
FIG. 9 is a schematic view of the latch mechanism in a second latched positon and a seat assembly in a second position.
Figure 10:
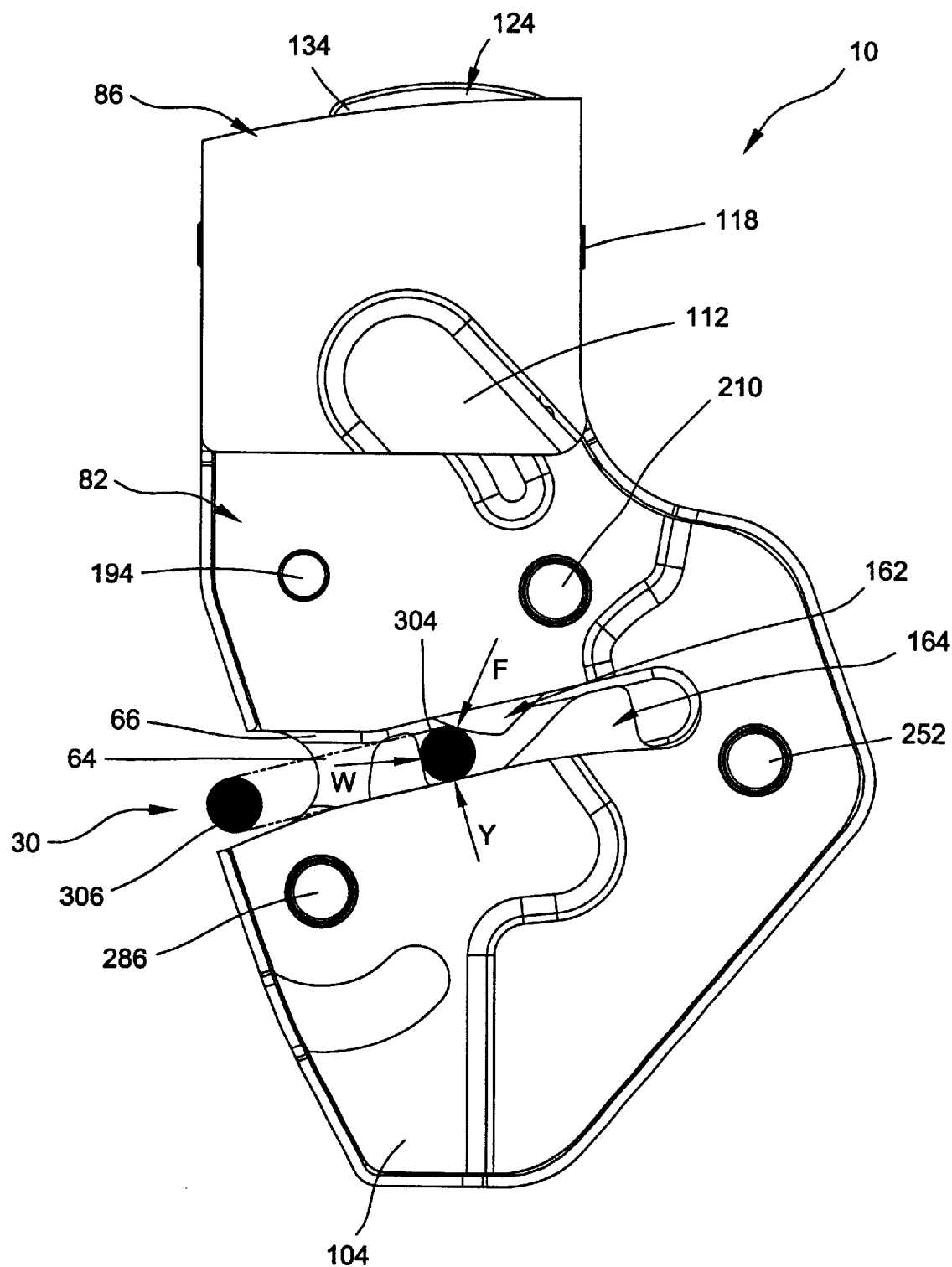
FIG. 10 is a side view of the latch mechanism in a first latched position to show the applied forces on a first striker.

With reference to FIGS. 7–9, a seat assembly 310 is shown incorporating the latch mechanism 10 of the present invention. The seat assembly 310 includes the latch mechanism 10, a seat bottom 312, and a seat back 314, pivotably supported by the seat bottom 312. In addition, the striker assembly 302 is provided and is fixedly supported by a vehicle structure 316. The latch mechanism 10 is disposed generally at the base of the seat back 314, whereby the striker recess 30 is oriented such that the striker assembly 302 will engage the striker recess 30 upon rotation of the seat back 314 relative the seat bottom 312.

Initially, the seat back 314 is disengaged from the seat bottom 312, as shown in FIG. 7. To engage the latch mechanism 10 and the striker assembly 302, a force is applied to the seat back 314 such that the seat back 314 is rotated relative to the seat bottom 312. Sufficient rotation of the seat back 314 causes the first striker bar 304 of the striker assembly 302 to engage the striker recess 30 and ultimately contact the push-plate 166. As previously described, rotation of the push-plate 166 causes the claw 164 to rotate and engage the first striker bar 304, thereby locking the first striker bar 304 between the actuator 162 and the claw 164. In this position, the seat back 314 is locked in a first angular position relative to the seat bottom 312, as shown in FIG. 8.

To lock the seat back 314 in another angular position relative to the seat bottom 312, a force is applied to the actuation handle 124 to rotate the actuation handle 124 against the bias of the handle spring 142. Concurrently, a force is also applied to the seat back 314 until the latch mechanism 10 has been properly aligned with the striker assembly 320, whereby the first striker bar 304 is aligned with the second notch 250 and the second striker bar 306 is aligned with the first notch 248. In this position, the actuation handle 124 may be released, whereby the claw 164 will rotate and engage the first and second striker bars 304, 306, as previously discussed. Once the actuation handle 124 is released, and the first and second striker bars 304, 306 are locked by the claw 164, the seat back 314 is locked in a second angular relationship relative to the seat bottom, as best shown in FIG. 9.

To disengage the seat back 314 from the latch mechanism 10, a force is again applied to the actuation handle 124 against the bias of the handle spring 142. Concurrently, a force is applied to the seat back 314 such that as the first and second striker bars 302, 304 are released form contact with the claw 164, the seat back 314 may be rotated and the striker assembly 302 will be released form engagement with the latch mechanism 10. In this manner, the seat back 314 is permitted to rotate relative to the seat bottom 312.

Again, when the seat back 314 is locked in either the first or second latched position, the force F applied by the actuator 162 eliminates movement of either the first or second striker 304, 306 within the first notch 248 of the claw 164, as best shown in FIG. 11. In this manner, movement of the seat back 314 relative to the vehicle structure 316 is prohibited. In addition, slight movement of the seat back 314 relative the vehicle structure 316 is eliminated, thereby reducing chucking and improving occupant comfort.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat latch mechanism, comprising:
   a housing adapted to receive a striker;
   a latch assembly including a claw and an actuator rotatably supported by said housing, said latch assembly operable between a latched position and an unlatched position; and
   an actuation assembly operably supported by said housing and in operable communication with said latch assembly to selectively unlatch said latch assembly, said latch assembly operable to selectively lock said striker in a first latched position between said claw and said actuator and in a second latched position between said claw and said housing, said actuator operable to apply a force to said striker and urge said striker against said claw and said housing in said first latched position.

2. The seat latch mechanism of claim 1, wherein said claw is biased by a first biasing member into said latched position.

3. The seat latch mechanism of claim 1, wherein said actuator is biased by a second biasing member into said latched position.

4. The seat latch mechanism of claim 1, wherein said latch assembly includes a roller disposed between said actuator and said claw, wherein rotation of one of said claw and said actuator causes rotation of the other of said claw and said actuator.

5. The seat latch mechanism of claim 1, wherein said latch assembly further includes a push-plate, said push-plate operable to engage said striker.

6. The seat latch mechanism of claim 5, wherein said push-plate is biased by a third biasing member into said unlatched position.

7. The seat latch mechanism of claim 5, wherein said push-plate engages said claw to hold said claw in said unlatched position against the bias of said first biasing member, said push-plate allowing said claw to move into said latched position when said push-plate contacts said striker.

8. The seat latch mechanism of claim 1, wherein said actuation assembly further includes a lock cam, said lock cam operable to engage said actuator and hold said actuator in said latched position.

9. The seat latch mechanism of claim 8, wherein said lock cam is biased by a fourth biasing member into said latched position.

10. The seat latch mechanism of claim 8, wherein said actuation assembly further includes a handle pivotably connected to said lock cam, said handle operable to release said latch mechanism from said latched position.

11. A seat latch mechanism, comprising:
    a housing adapted to receive a striker, said striker including a first striker bar and a second striker bar;
    a latch assembly operable between a latched position and an unlatched position, said latch assembly including a claw and an actuator rotatably supported by said housing; and
    an actuation assembly operably supported by said housing and in operable communication with said latch assembly to selectively unlatch said latch assembly, said latch assembly operable to selectively lock said first striker bar in a first latched position between said claw and said actuator and in a second latched position between said claw and said housing, said second striker bar latched between said claw and said actuator when said first striker bar is in said second latched position.

12. The seat latch mechanism of claim 11, wherein said actuator engages said first striker bar in said first latched position and engages said second striker bar in said second latched position, said actuator operable to apply a force to either of said first and second striker bars and urge said first and second striker bars against an inner surface of said claw and said housing.

13. The seat latch mechanism of claim 11, wherein said claw includes a first and second recess, said first recess operable to receive said first striker bar in said first latched position and operable to receive said first striker bar in said second recess in said second latched position.

14. The seat latch mechanism of claim 13, wherein said actuator is operable to apply a force on said first striker bar in said first latched position and on said second striker bar in said second latched position.

15. The seat latch mechanism of claim 11, wherein said actuation assembly further includes a lock cam, said lock cam operable to engage said actuator and hold said actuator in said latched position.

16. The seat latch mechanism of claim 15, wherein said actuation assembly further includes a handle pivotably connected to said lock cam, said handle operable to release said latch mechanism from said latched position.

17. The seat latch mechanism of claim 16, wherein said handle is operable to release said claw from said latched position to permit said first striker bar to move between said first latched position and said second latched position.

18. The seat latch mechanism of claim 15, wherein said latch assembly includes a roller disposed between said actuator and said claw, wherein rotation of one of said claw and said actuator causes rotation of the other of said claw and said actuator.

19. A seat assembly, comprising:
a seat bottom;
a seatback pivotally supported by said seat bottom;
a first striker; and
a seat latch mechanism selectively engaging said first striker, said seat latch mechanism including:
a housing adapted to receive said first striker;
a latch assembly including a claw and an actuator rotatably supported by said housing, said latch assembly operable between a latched position and an unlatched position; and
an actuation assembly operably supported by said housing and in operable communication with said latch assembly to selectively unlatch said latch assembly, said latch assembly operable to selectively lock said first striker in a first latched position between said claw and said actuator and in a second latched position between said claw and said housing, said actuator operable to apply a force to said first striker and urge said first striker against said claw and said housing in said first latched position.

20. The seat latch mechanism of claim 19, wherein said claw is biased by a first biasing member into said latched position.

21. The seat latch mechanism of claim 19, wherein said actuator is biased by a second biasing member into said latched position.

22. The seat latch mechanism of claim 19, wherein said latch assembly includes a roller disposed between said actuator and said claw, wherein rotation of one of said claw and said actuator causes rotation of the other of said claw and said actuator.

23. The seat latch mechanism of claim 19, wherein said latch assembly further includes a push-plate, said push-plate operable to engage said first striker.

24. The seat latch mechanism of claim 23, wherein said push-plate is biased by a third biasing member into said unlatched position.

25. The seat latch mechanism of claim 24, wherein said push-plate is operable to engage said claw to hold said claw in said unlatched position against the bias of said first biasing member, said push-plate operable to allow said claw to move into said latched position when said push-plate contacts said first striker.

26. The seat latch mechanism of claim 19, wherein said actuation assembly further includes a lock cam, said lock cam operable to engage said actuator and hold said actuator in said latched position.

27. The seat latch mechanism of claim 26, wherein said lock cam is biased by a fourth biasing member into said latched position.

28. The seat latch mechanism of claim 26, wherein said actuation assembly further includes a handle pivotably connected to said lock cam, said handle operable to release said latch mechanism from said latched position.

29. The seat latch mechanism of claim 28, wherein said actuation assembly is pivotably connected to said lock cam by a link.

30. The seat latch mechanism of claim 19, further including a second striker bar, said second striker bar disposed between said claw and said actuator when said first striker bar is in said second latched position.

31. The seat latch mechanism of claim 30, wherein said second striker is fixedly connected to said first striker bar by a cross-member.

32. The seat latch mechanism of claim 30, wherein said actuator is operable to apply a force to said second striker bar when said first striker bar is in said second latched position, said second striker bar urged against said claw and said housing by said actuator.

* * * * *